United States Patent [19]

Tulloch

[11] Patent Number: 4,739,848
[45] Date of Patent: Apr. 26, 1988

[54] SCALES

[75] Inventor: Robert Tulloch, Royston, Great Britain

[73] Assignee: Esselte Meto International GmbH, Hirschhorn, Fed. Rep. of Germany

[21] Appl. No.: 817,859

[22] PCT Filed: Apr. 12, 1985

[86] PCT No.: PCT/GB85/00166

§ 371 Date: Dec. 10, 1985

§ 102(e) Date: Dec. 10, 1985

[87] PCT Pub. No.: WO85/04711

PCT Pub. Date: Oct. 24, 1985

[30] Foreign Application Priority Data

Apr. 13, 1984 [GB] United Kingdom ............... 8409629
Apr. 13, 1984 [GB] United Kingdom ............... 8409630
Apr. 13, 1984 [GB] United Kingdom ............... 8409631
Apr. 13, 1984 [GB] United Kingdom ............... 8409632

[51] Int. Cl.⁴ .......................... G01G 3/14; G01L 1/22
[52] U.S. Cl. ................................ 177/211; 73/862.65
[58] Field of Search ..................... 177/211; 73/862.65

[56] References Cited

U.S. PATENT DOCUMENTS 3,611,797 10/1971 Pugnaire ..................... 73/862.65
4,355,692 10/1982 Ostrelich ..................... 177/211
4,574,899 3/1986 Griffin ........................ 177/211

Primary Examiner—George H. Miller, Jr.

[57] ABSTRACT

A bathroom scale has a load receiving platform (1) on which a user can stand and display means (8). Weight on the platform (1) is transferred to a stainless steel force plate (3) mounted on a base member (2) and having double encastred beams (42) formed by cutouts (43). The beams (42) are supported on knife edge support members (52), and a plurality of piezo electric strain gauges (44 to 47) are screen printed on an insulating coating on the beams (42) of the force plate adjacent the positions at which the force plate is supported on the support members (52). Deformation of the beams (42) as a result of weight on the platform (1) produces electrical signals which are summed to form a composite load signal and the display means (8) displays the composite load signal as a weight reading.

Summing the electrical signals from the strain gauges electrically, avoids many of the disadvantages and errors associated with scales which utilize a mechanical linkage to sum weight components.

10 Claims, 6 Drawing Sheets

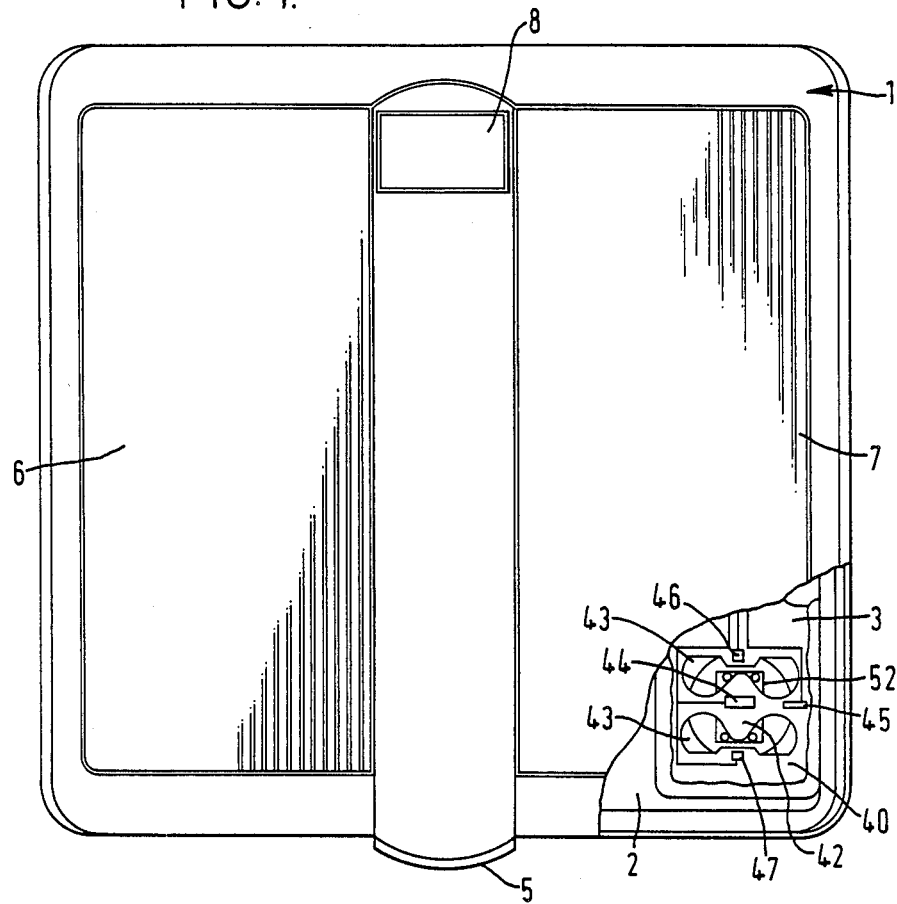
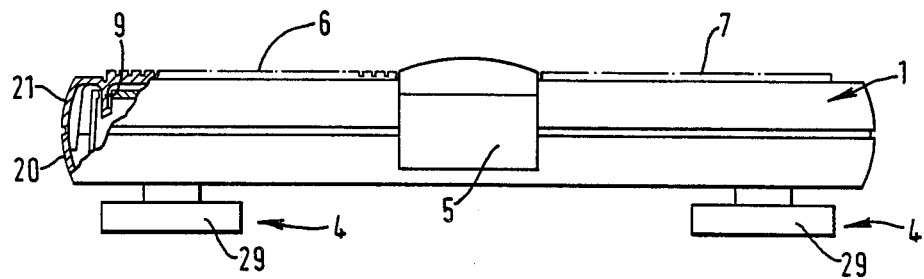

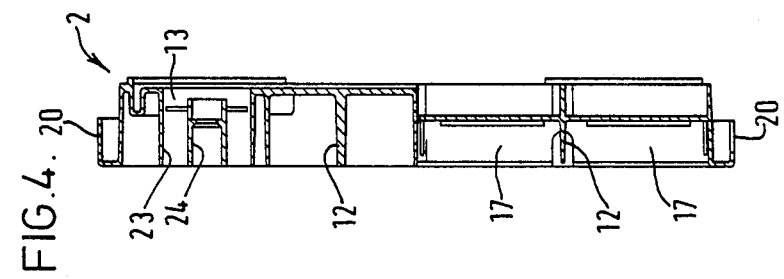
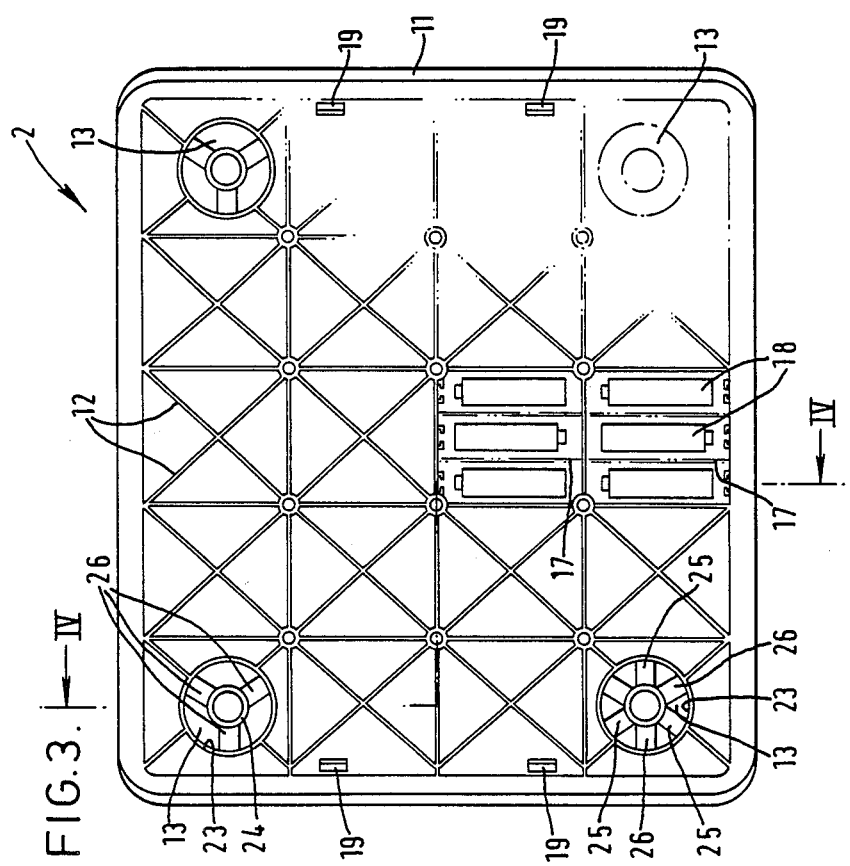

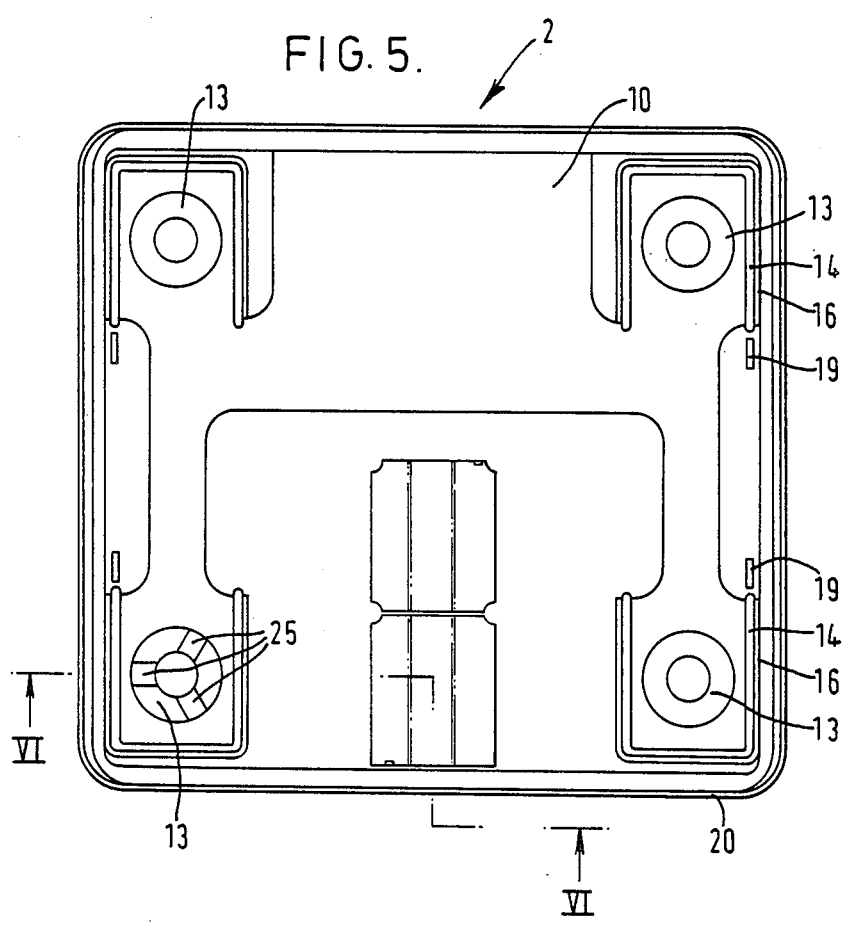
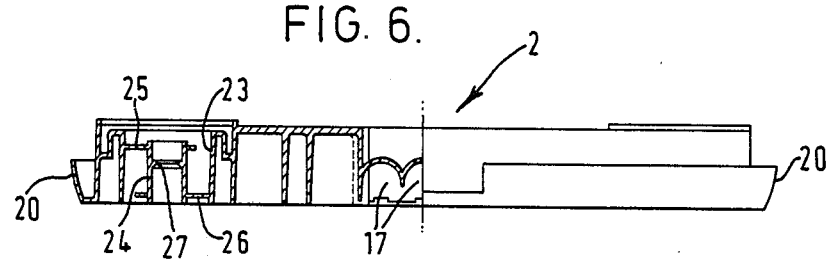

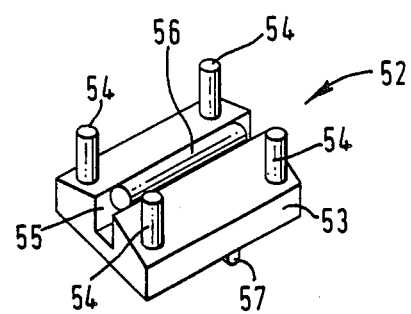
FIG. 8.
FIG. 9.
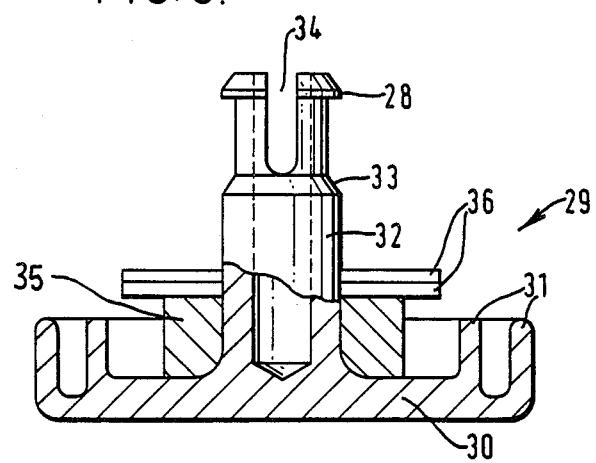

SCALES

The invention relates to scales and particularly but not exclusively to scales for weighing people of the kind that are used in the home and are usually referred to as bathroom scales.

Bathroom scales with a mechanical linkage operating against a spring and rotating a dial are well known and are widely used. Scales with a digital readout have also been proposed but such scales normally incorporate a single transducer acted on by a mechanical linkage of the kind used in conventional bathroom scales and are consequently no more acurate than such previous designs.

According to the invention, scales are provided including a load receiving platform and display means characterised in that weight on the platform is transferred to at least one force plate supported on support members, a plurality of strain gauges are mounted on the force plate or plates adjacent the positions at which the force plate or plates is or are supported on th support members and are effective, upon deformation of the force plate or plates as a result of weight on the platform, to produce electrical signals, means are provided for summing the electrical signals to form a composite load signal and the display means display the composite load signal as a weight reading.

By summing the electrical signals from the strain gauges electrically, many of the disadvantages and errors associated with scales which utilise a mechanical linkage to sum weight components can be obviated.

Preferably the force plate or plates includes at least three and preferably four strain gauges and preferably each strain gauge comprises a pair of piezo electric resistors. Advantageously, the portion of the or each force plate against which each of the respective support members bears is formed as a double encastred beam, that is to say having both ends in the force plate, and the piezo electric resistors are provided one at or adjacent the centre of the beam and the other at or adjacent one of the ends of the beam such that when the beam is loaded one resistor is placed in tension and the other is placed in compression.

Preferably the resistors and connections therefore are provided on the force plate or plates by thick film screen printing.

Advantageously, the force plate is formed of stainless steel coated with a dielectric material and has all the resistors forming the strain gauges and connection therefore screen printed and fired on the dielectric material.

Each beam is preferably of substantially diamond shape and is formed by stamping out portions of the stainless steel plate to leave the beam of narrow width adjacent its ends and with a wide middle portion, the transitions between the ends and the middle portion being rounded off from a strict diamond shape. Preferably the force plate is generally U-shaped so that, in the interests of economic use of material, a sheet of material can be cut up with very little wastage by interlocking three U-shapes together, that is to say with the limbs of two of the shapes nested between the two limbs of the third U-shape.

Advantageously each beam has its longitudinal extent at right angles to the longitudinal extent of the arm of the U-shaped force plate in which it is provided.

Preferably each support member bears against the underside of the middle portion of a respective one of the beams by means of a transverse knife edge type mounting. Each knife edge type mounting preferably has upstanding spigots to locate the mounting by bearing against side edges of the respective beam. Preferably the actual knife edge that bears against the beam is of a length considerably less than the width of the beam, for example half the width of the beam, and is slightly convex to reduce errors due to sensitivity of the strain gauges to transverse strain. The support members are preferably vertically movable in a base member to which the force plate is secured. Preferably the base member is formed of a plastics material, such as polypropylene, and has in its upper face recesses which receive downwardly extending flanges provided on the force plate. The base member advantageously has upstanding portions adjacent the recesses, which upstanding portions can, after engagement of the flanges of the force plate in the recesses, be deformed to overlie the force plate to secure ti in position with respect to the base member.

Preferably the support members each comprise an upright central tubular column connected by upper and lower webs to an outer member whereby the central tubular column is vertically movable with respect to the outer member by flexing of the upper and lower webs. The outer member is preferably formed as a part of the base member such that each entire support member is integral with the base member. Feet may be coupled to the central tubular columns and bear against a floor.

A weight applied to the load receiving platform is transmitted to the force plate by means of bearing surfaces on the plat form which bear on the force plate and such weight is transferred to the feet of through the central tubular columns of the support members, which central tubular columns bear, by means of the knife edge type mountings, against the middle portions of the beams of the force plate thereby to cause deformation of such beams and cause an electrical signal to be generated by the strain gauges printed on the beams.

Preferably the feet of the central tubular columns are spaced only a relatively small distance below portions of the base member such that downward movement of the base member relative thereto is limited. Such downward movement is preferably cushioned by resilient means which are compressed by the downward movement of the base member with respect to the feet of the central tubular columns.

If desired the force plate could be provided as a plurality of screen printed portions mounted on the base member, for example four portions each formed of stainless steel, including a beam and co-operating with a respective support member and a further portion, for example formed of screen printed alumina, mounting the signal summing and processing means and the display means, electrical connections between the four portions and the further portion then being provided by flexible leads.

The invention is diagrammatically illustrated by way of example in the accompanying drawings in which:

FIG. 1 is a plan view of scales according to the invention in the form of bathroom scales with a corner of an upper platform cut away;

FIG. 2 is an elevation corresponding to FIG. 1;

FIG. 3 is an underneath view of a base member of the bathroom scales of FIG. 1;

FIG. 4 is a part sectional view on line IV—IV of FIG. 3;

FIG. 5 is a plan view of the base member of FIGS. 3 and 4;

FIG. 6 is a part sectional view on line VI—VI of FIG. 5;

FIG. 8 shows a knife edge member to be provided between a beam of the force plate of FIG. 7 and a support member of the base member of FIGS. 3 to 6;

FIG. 9 shows a foot for a support member; and

Figure 7:
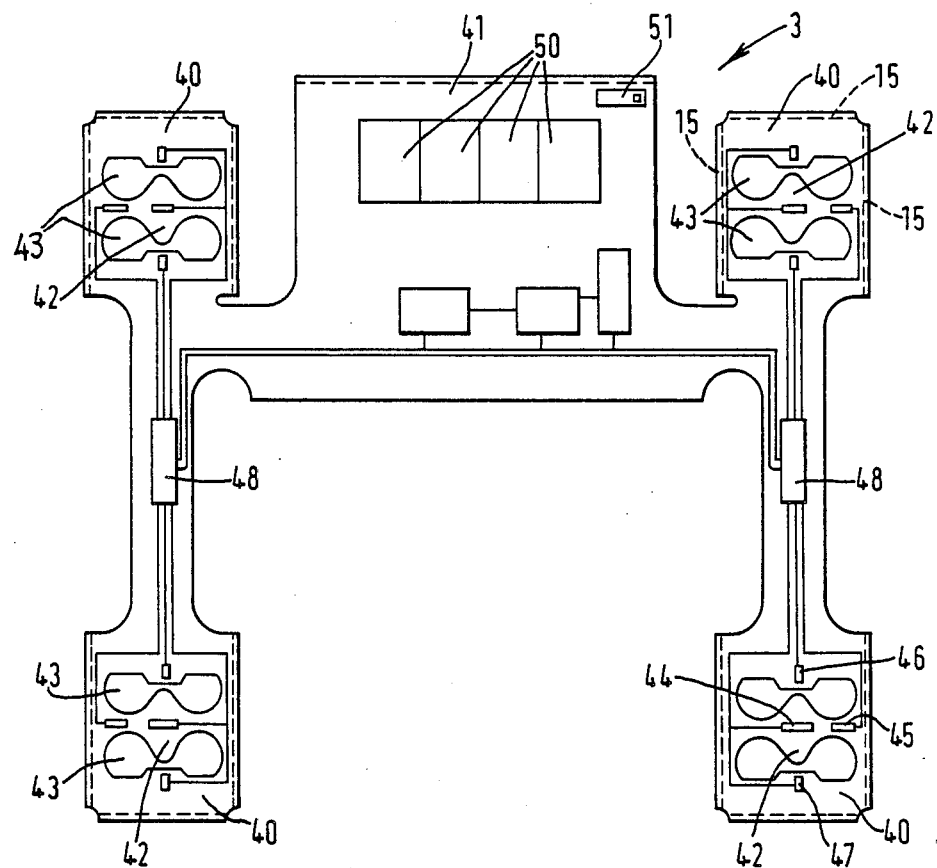
FIG. 7 is a plan view of a force plate of the bathroom scales of FIGS. 1 to 6.

Referring to the drawings, bathroom scales comprise a load receiving platform 1, a base member 2 on which a force plate 3 is mounted and floor engaging feet which act upon portions of the force plate 3 to cause deformation thereof, the deformation of the force plate 3 being sensed by piezo electric strain gauges to give an electric readout.

The load receiving platform 1 is preferably moulded of a plastics material such as ABS and has a portion 5 formed as a kick switch to energise electrical apparatus of the scales, two footpads 6 and 7 to receive the two feet of a person to be weighed, a window 8 through which a digital weight readout is visible and, as seen in the cutaway portion at the left-hand side of FIG. 2, downwardly depending hook shaped members 9 which engage in apertures in the base member 7 to retain the load receiving platform 1 and the base member 2 in juxtaposition.

The base member 2 is advantageously injection moulded of a plastics material such as polypropylene and is formed with an upper generally continuous deck portion 10, a surrounding downwardly depending wall 11 and strengthening webs 12 on the underside connecting the deck 10 and wall 11. At each corner the base member 2 is formed with a load cell 13. Adjacent each load cell 13 is a recess 14 which is U-shaped in plan view and which receives downwardly depending flanges 15 of portions of the force plate 3. Adjacent the recesses 14 are upstanding wall portions 16 which, after the flanges 15 of the force plate 3 have been engaged in the recesses 14 in the base member 2, are heat staked over to secure the force plate 3 in position with respect to the base member 2. Recesses 17 are provided on the underside of the base member 2 for batteries 18 as shwon in FIG. 3, which Figure also shows apertures 19 which receive the downwardly projecting hook shaped members 9 of the load receiving platform 1. The base member 2 has an upstanding flange 20 around its outer edge as shwon in FIG. 4 and 6, which flange 20 co-operates with a downwardly depending similar flange 21 of the load receiving platform 1, as shown in FIG. 2, to form a smooth outer edge.

Each load cell 13 comprises an outer cylindrical wall 23, a central tubular column 24, upper connecting webs 25 and lower connecting webs 26. The upper connecting webs 25 are offset angularly with respect to the lower connecting webs 26 for ease of moulding. The upper webs 25 and the lower webs 26 may each be three in number and spaced at 120° angles the angular offset then being 60°. Alternatively the upper webs and the lower webs may be only two in number but spaced at 120° angles to one another with the upper set of webs offset angularly from the lower set of webs. The section of the webs may vary along the length thereof, particularly they may be reduced to only half thickness adjacent their connection to either or both of the outer cylindrical wall 23 and the central tubular column 24. It will be seen that the webs 25 and 26 permit the central tubular column 24 to move generally vertically with respect to the outer cylindrical wall 23. The central tubular column 24 has, as can be seen in FIGS. 4 and 6, a circumferential rib 27 in its base, which rib 27 co-operates with a flange 28 of a foot 29 shown in FIG. 9 to retain the foot 29 within the central tubular column 24. The foot 29 comprises a circular bottom flange 30 with an upstanding double skirt 31 and a central column 32 with a shoulder 33 thereon spaced downwardly from the flange 28. The colum 32 is tubular and provided with a slit 34 at its upper end such that it can be pressed into the bore of the respective central tubular member 24 of a load cell 13 to cause the flange 24 to pass upwardly beyond the rib 27. FIG. 9 also shows that a rubber bush 35 is provided around the lower portion of the column 32 with a double washer 36 thereabove. The double washer 36 bears against the underside of the central tubular column 24 of the respective load cell 13. The inner flange of the double skirt 31 of the foot member 29 is of the same diameter as the outer cylindrical wall 23 of the respective load cell 13. As load is applied the pressure applied to the foot 29 will be transmitted through the rubber bush 35 and washer 36 to the central tubular column 24 to cause the central tubular column 24 to move upwardly with respect to the base member 2. The rubber bush 35 will be compressed and after a short distance of travel of the foot 29 and the central tubular column 24, the inner flange of the skirt 31 will abut the lower edge of the outer cylindrical wall 23 to prevent further movement and thus undue distortion of the webs 25 and 26.

Referring to FIG. 7 the force plate 3 comprises four load portions 40 and a further portion 41 mounting electronic circuit means, the overall shape of the force plate 3 being generally a U-shape. The force plate 3 is preferably formed from 1.6 mm thick or 2 mm thick stainless steel and is punched to form a double encasted stress beam 42 in each of the load portions 40. Thus each load portion 40 is formed with two apertures 43 therein, each aperture 43 being of a two lobed shape to form each beam 42 with narrow end portions and a wide middle portion such that the beam has a generally diamond shape but the transitions between portions are smoothed. A double-diamond shape for the beam can give a generally rectangular top-hat shape to a stress diagram for the beam which is highly desirable since it gives regions of constant stress around the centre and at each end to obtain maximum output from the strain gauges even if not accurately positioned. The beam 42 have their longitudinal direction at right angles to the longitudinal direction of the arm of the force plate 3 on which they are provided so that forces causing flexing of the arms of the force plate, for example due to unevenness of a floor on which the feet 29 are resting, do not affect the strain gauges on the beams 42. The upper surface of the stainless steel force plate 3, except for extreme peripheral portions thereof, is coated with a 40 $\mu$m thick dielectric layer of glass ceramic and the dielectric layer has thick film conductive printing thereon effected by screen printing, such printing forming electric resistive strain gauges on and adjacent the beams 42. Thus each load portion 40 mounts a Wheatsone Bridge circuit comprising four resistors 44, 45, 46 and 47. The resistor 44 is provided in the middle portion of the beam 42, the resistor 45 is provided at one of the end portions of the beam 42 and the resistors 46 and 47 are provided on unstressed portions of the load portion 40 adjacent the beam 42. Screen printed electrical connections to the electronic circuitry on the further portion 41 of the force plate 3 are provided by way of pre-amplifying units 48 and after control by a microprocessor a digital display 50 with four digits can give a weight reading. A selector switch 51 can change the reading between metric and imperial.

A knife edge member 52 is shown in FIG. 8 and comprises a base member 53 of plastics material with four upstanding pegs 54, a groove 55 in the base member 53 and a length of hardened steel rod 56 received in the groove 55.

As can be seen in the right-hand cut-away portion at the bottom of FIG. 1, the knife edge member 52 engages beneath a respective one of the beams 42 with the upstanding pegs 54 engaging the edges of the beam 42 and retaining the member 52 in position so that the steel rod 56 which forms the knife edge bears against the underside of the beam 42. The steel rod 56 is preferably of a length equal to approximately half the width of the beam 42 at its widest and has a slightly convex upper surface, i.e. the ends of the rod 56 are slightly lower than its mid position. The steel rod 56 could be omitted and be replaced by a plastics portion of similar shape moulded integral with the base member 53. The upper end of the central tubular column 24 of the respective load cell 13 bears against the underside of the base 53 of the knife edge member 52. FIG. 8 shows a rib 57 provided on the underside of the base member 53 and extending transverse to the steel rod 56. The rib 57 bears on the upper end of the central tubular column 24 and provides a degree of freedom of movement.

Downwardly projecting ribs on the underside of the load receiving platform 1 bear against the upper face of the force plate 3 to transfer to the force plate 3 any load applied to the foot pads 6 and 7 of the load receiving platform 1. The force plate 3 is supported only by the four knife edge members 52 which bear against the undersides of the beams 42 so that the weight is applied to the beams 42. The proportion of the total weight applied to each beam 42 depends upon the particular location of the feet of the user on the pads 6 and 7. The beams 42 deflect under the applied load applying a tension force to the resistors 44 and a compressive force to the resistors 45. The applied load therefore causes the Wheatstone Bridge circuit to supply an out of balance signal to the pre-amplifying units 48. The units 48 relay the signal to the microprocessors 49 which produce a weight reading at the readout 50.

The scales preferably have a capacity of 125 kg, with the overload capacity determined by the co-operation of the feed 29 with the outer cylindrical walls 23 of the load cells 13 set as 40 kg per foot.

Subsequent to printing of the resistors 44, 45, 46 and 47, the resistors 46 and 47 are laser or abrasive jet trimmed to the required values.

The dual pre-amplifier 48 placed centrally on each leg serves two purposes. Firstly it provides local amplification of the small sensor signal, and secondly it eliminates some long leads to the control electronics. In fact, only four essential leads on each side connect the central electronics with the load portions 40, i.e. supply voltage, ground, and the two pre-amplified signals.

A feedback resistor that sets the gain for each pre-amplifier is printed in the further portion 41 which is supposedly unstrained. It is printed in the same resistor paste as the gauge resistors 44 to 47 (10k ohm/sq.), but it is deliberately large in size (6 mm×2 mm), allowing for an accurate gain trim.

All resistors on the legs are oriented in the same way, such that they can be approached from the side with a travelling sandblast nozzle for trimming.

The central electronics on the further portion 41 includes a summing amplifier, an analogue to digital converter, a mask programmed microprocessor, the displays 50, drivers for the displays, an automatic switch-off circuit, voltage followers for power distribution, and terminal pads for the kick switch 5, the units switch 51 and the battery supply.

To avoid adhesion problems on the force plate 3, such as flaking off of the dielectric layer, it has been found to be necessary to effect a complete wet cleaning cycle involving degreasing and a slight acid etch, followed by thorough rinsing and drying.

To print and fire the conductors and the resistors 44 and 47, four screen prints are required with intermediate drying and subsequent cofiring, i.e.: condutor, resistor 100 ohm/sq., resistor 10k ohm.sq., resistor 1M ohm/sq.

It is preferable to cofire since refires of the conductor adversely affect its solderability, whilst resistors might change their value. These effects are more pronounced than on alumina substrates.

The thick film resistors 44 to 47 and the conductors should be covered by a low temperature firing (520 deg C.) glass layer that serves as a mechanical protection against scratch damage and as a solder mark so as to expose only those conductor pads intended to be soldered.

Figure 10:
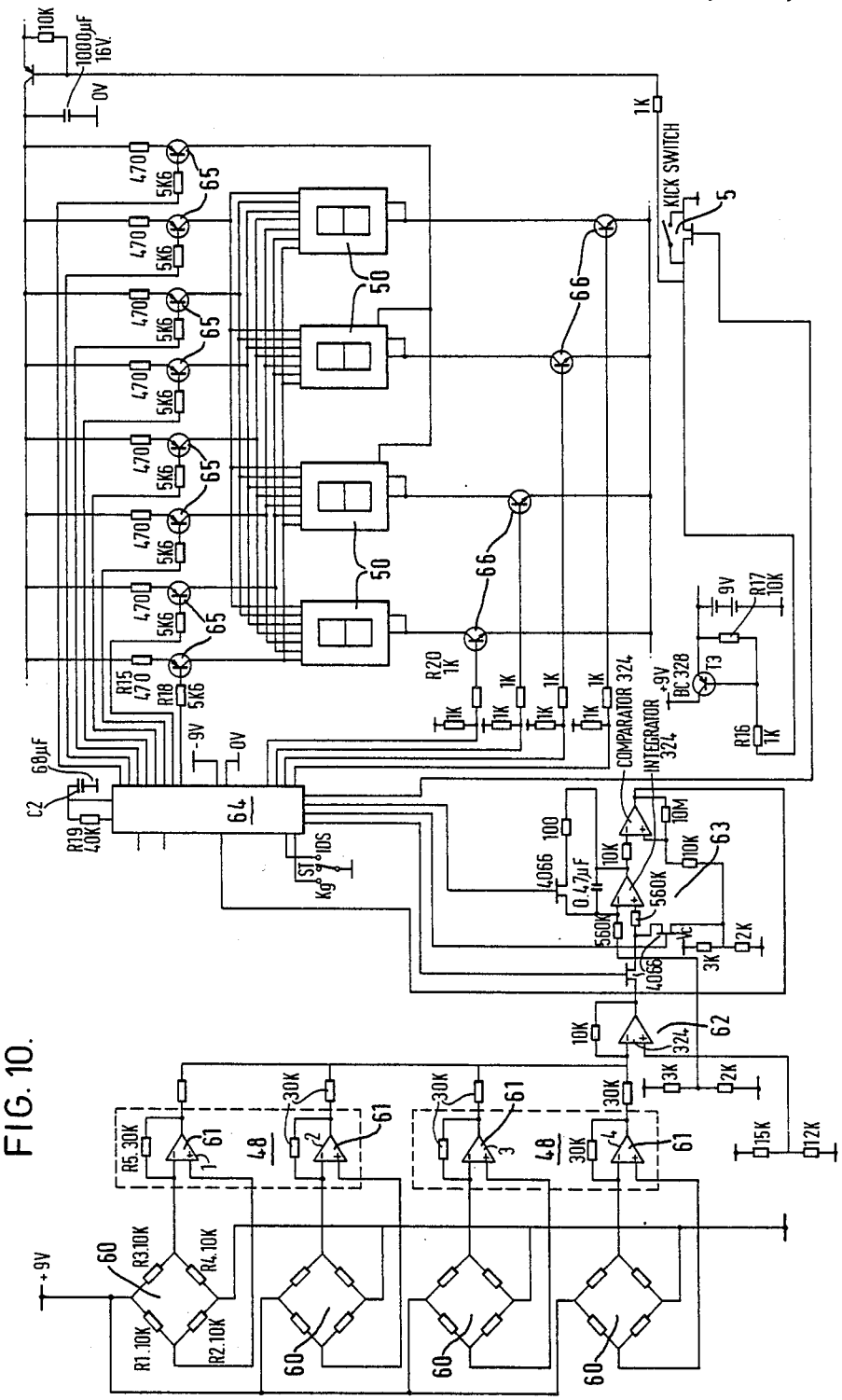
FIG. 10 shows a block diagram of an electronic circuit for the bathroom scales of FIGS. 1 to 9.

Referring to FIG. 10, the circuit shown can be notionally split into three sections:
Strain gauge bridges 60 and their amplifiers 61.
An analog to digital converter 63.
The display 50 and display drivers.

Referring to the circuit diagram, a strain gauge bridge is printed on each load portion 41. This is formed by 10K ohm resistors R1, R2, R3 and R4. Resistor R2 forms the tension element 44 in the bridge and is printed in the middle of each beam. R4 forms the compression element 45 and is sited at one end of the beam. As load is applied R2 increases in value linearly with load and R4 similarly decreases. The change in R2 at maximum load is nominally 1% of its value, i.e. 100 ohms. Resistors R1 and R3 are formed by the resistors 46 and 47, i.e. are sited near R2 and R4 but in areas where there is no strain in the substrate so that their value does not change as load is applied.

When the bridges are printed, the values of R1, R2, R3 and R4 are not identical so when the pre-amplifier 48, formed by two amplifiers 61 is put across it, the output of the pre-amplifier 48 for no load may not be half the supply voltage. To ensure this important initial condition R1 and R3 are trimmed.

It should be noted that since the active elements in the bridge are not in the same arm, an element of non linearity is introduced into the sensor. The extent of this error at the amplifier output can be shown to be dependent on two things, firstly the fractional change in resistance of the gauges (in this case 1%), and secondly the amplification of a buffer resistor R5.

A reduction in non-linearity could be obtained by swopping the position in the bridge of R2 and R3 i.e. to put both active elements in one arm. It is however, not possible to do this as an active element cannot be trimmed to balance the bridge for half supply voltage at no load condition. To trim such an element would introduce micro cracking into that element, leading to early failure.

The outputs of the four sensor amplifiers 61 contained in the pre-amplifiers 48 are summed together. This is achieved by using a summing amplifier 62. This is set up by trimming a 12K resistor attached to its + input until the voltage on the + input is half the supply voltage.

The output of the amplifier 62 should then also be at half supply voltage. A load subsequently applied to any sensor 60 will cause its buffer voltage to move upwards from half the supply voltage. This, along with the outputs of the other sensor amplifiers is then summed, causing the output of the amplifier 62 to move downwards from half the supply voltage. In order to ensure that the sensitivity of each bridge is the same, R5 is trimmed for each sensor so that for a load of 40 kg applied, the output of the summing amplifier 62 changes by −250 mV. Thus in the full overload state, i.e. 40 kg on each load cell, the output of the amplifier 62 will be −1 V, relative to a 4.5 volt no load condition.

The voltage appearing at the output of the summing amplifier 62 is measured by the use of the dual slope analog to digital converter 63. The converter 63 is controlled by a microprocessor 64 and it is this device which performs the counting functions associated with the operation.

The display 50 is a four digit seven segment LED display. It is driven via buffering transistors by the microprocessor 64. Eight transistors 65 select which segment in the display are to be lit, and four transistors 66 select which of the displays in enabled.

I claim:

1. A scale comprising
(a) a load receiving platform;
(b) a force plate upon which said load receiving platform is supported;
(c) a plurality of substantially diamond-shaped double encastred beams, each beam having both ends secured in the force plate;
(d) a plurality of support members, each support member bearing upon one of the beams such that each beam is supported by one support member and such that the entire weight of the load receiving platform, the force plate and any weight placed upon the load receiving platform is transmitted through the beams to the supporting members, thereby deforming the beams;
(e) a plurality of strain gauges, each gauge comprising a pair of piezoelectric resistors wherein, for each pair of piezoelectric resistors, one resistor is mounted centrally on the beam and the other resistor is mounted laterally on the beam such that deformation of the beam causes the strain gauges to produce electrical signals;
(f) a means for summing the electrical signals to form a composite load signal; and
(g) means for displaying the composite load signal as a weight reading.

2. The scale of claim 1 wherein the pair of piezo electric resistors are mounted such that when the beam is deformed, one resistor is placed in tension and the other resistor is placed in compression.

3. A scale comprising
(a) a load receiving platform;
(b) a force plate upon which said load receiving platform is supported;
(c) a plurality of substantially diamond-shaped double encastred beams, each beam having both ends secured in the force plate;
(d) a plurality of support members, each support member bearing upon one of the beams such that the entire weight of the load receiving platform the force plate and any weight placed upon the load receiving platform is transmitted through the beams to the supporting members, thereby deforming the beams;
(e) a plurality of strain gauges, each gauge comprising a pair of piezoelectric resistors wherein the resistors are mounted by thick film screen printing and one gauge is mounted on each beam such that deformation of the beam causes the strain gauges to produce electrical signals;
(f) a means for summing the electrical signals to form a composite load signal; and
(g) means for displaying the composite load signal as a weight reading.

4. A scale comprising
(a) a load receiving platform;
(b) a force plate upon which said load receiving platform is supported, the force plate being formed of stainless steel coated with a dielectric material;
(c) a plurality of substantially diamond-shaped double encastred beams, each beam having both ends secured in the force plate;
(d) a plurality of support members, each support member bearing upon one of the beams such that the entire weight of the load receiving platform, the force plate and any weight placed upon the load receiving platform is transmitted through the beams to the supporting members, thereby deforming the beams;
(e) a plurality of strain gauges, each gauge comprising a pair of piezoelectric resistors, wherein one gauge is mounted on each beam and all the resistors forming the strain gauges are screen printed and fired on the dielectric material of the force plate such that deformation of the beam causes the strain gauges to produce electrical signals;
(f) a means for summing the electrical signals to form a composite load signal; and
(g) means for displaying the composite load signal as a weight reading.

5. A scale comprising
(a) a load receiving platform;
(b) a force plate upon which said load receiving platform is supported;
(c) a plurality of substantially diamond-shaped double encastred beams, each beam having both ends secured in the force plate and being of narrow width adjacent its ends and having a wide middle portion, the transitions between the ends and the middle portion being rounded off from a strict diamond shape;
(d) a plurality of support members, each support member bearing upon one of the beams such that the entire weight of the load receiving platform, the force plate and any weight placed upon the load receiving platform is transmitted through the beams to the supporting members, thereby deforming the beams;

(e) a plurality of strain gauges, one mounted on each beam such that deformation of the beam causes the strain gauges to produce electrical signals;

(f) a means for summing the electrical signals to form a composite load signal; and (g) a means for displaying the composite load signal as a weight reading.

6. The scale of claim 5 wherein the force plate is formed of stainless steel and each beam is formed by stamping out portions of the force plate.

7. The scale of claim 5 wherein the force plate is substantially U-shaped and each beam has its longitudinal extent at right angles to the longitudinal extent of the arm of the force plate.

8. A scale comprising (a) a load receiving platform;

(b) a force plate upon which said load receiving platform is supported;

(c) a plurality of substantially diamond shaped double encastred beams, each beam having both ends secured in the force plate;

(d) a plurality of support members wherein, each support member bears against the underside of the middle portion of one of the beams by means of a transverse knife-edge mounting such that each beam is supported by one support member and such that the entire weight of the load receiving platform is transmitted through the beams to the supporting members, thereby deforming the beams;

(e) a plurality of strain gauges, one mounted on each beam such that the deformation of the beam causes the strain gauges to produce electrical signals;

(f) a means for summing the electrical signals to form a composite load signal; and (g) means for displaying the composite load signal as a weight reading.

9. The scale of claim 8 wherein each knife-edge is slightly convex and of a length substantially less than the width of the beam.

10. A scale comprising (a) a load receiving platform;

(b) a force plate upon which said load receiving platform is supported;

(c) a plurality of substantially diamond-shaped double encastred beams, each beam having both ends secured in the force plate;

(d) a plurality of support members, each support member comprising an upright central tubular column connected by upper and lower webs to an outer member whereby the central tubular column is vertically movable with respect to the outer member by flexing of the upper and lower webs, and each support member bears upon one of beams such that each beam is supported by one support member and such that the entire weight of the load receiving platform, the force plate and any weight placed upon the load receiving platform is transmitted through the beams to the supporting members, thereby deforming the beams;

(e) a plurality of strain gauges, one mounted on each beam such that deformation of the beam causes the strain gauges to produce electrical signals;

(f) a means for summing the electrical signals to form a composite load signal; and (g) means for displaying the composite load signal as a weight reading.

* * * * *